United States Patent [19]
Schuurman

[11] Patent Number: 5,723,058
[45] Date of Patent: Mar. 3, 1998

[54] ABSORBENT COMPOSITIONS FOR REFRIGERATING AND HEATING SYSTEMS

[76] Inventor: Eiko A. Schuurman, P.O. Box No. 645, 3430 AP Niewegein, Netherlands

[21] Appl. No.: 625,227

[22] Filed: Apr. 1, 1996

[51] Int. Cl.⁶ ............................... C09K 5/04; C09K 5/00
[52] U.S. Cl. ..................... 252/69; 252/67; 62/112
[58] Field of Search .................... 252/69, 67; 62/112

[56] References Cited

U.S. PATENT DOCUMENTS

| | | | |
|---|---|---|---|
| 3,004,919 | 10/1961 | Rush et al. | 252/67 |
| 3,296,814 | 1/1967 | Lynch et al. | 62/112 |
| 3,478,530 | 11/1969 | Aronson | 62/112 |
| 4,801,393 | 1/1989 | Erickson | 252/69 |
| 4,857,222 | 8/1989 | Itoh et al. | 252/69 |
| 5,108,638 | 4/1992 | Lizuka et al. | 252/69 |
| 5,242,554 | 9/1993 | Kaczur et al. | 204/95 |
| 5,577,388 | 11/1996 | Chandler et al. | 62/112 |

FOREIGN PATENT DOCUMENTS 2-65071  3/1990  Japan .

OTHER PUBLICATIONS

Chemical Abstracts, vol. 101, No. 138244, "Heats of Dissolution of Lithium Tetrafluoroborate in Water . . . ", Vesekina et al, 1984.

Hainsworth, "Refrigerants and Absorbents", Part I, Refrigerating Engineering, vol. 48, No. 2, pp. 97–100, Aug. 1944.

Hainsworth, "Refrigerants and Absorbents", Part II, Refrigerating Engineering, pp. 201–205, Sep. 1944.

Aker et al, "An evaluation of alcohol–salt mixtures as absorption refrigeration solutions", ASHRAE Journal, May 1965, pp. 90–91.

Aker et al, "An evaluation of alcohol–salt mixtures as absorption refrigeration solutions", ASHRAE Semiannual Meeting, Jan. 1965.

*Primary Examiner*—Christine Skane

[57] ABSTRACT

Absorption heat pump system and process for heating, refrigeration, air conditioning and heat transforming, employing an aqueous buffer solution of a lithium salt therein; an aqueous buffer solution of a lithium salt perfectly neutral in pH useful as a coolant, achieving a very high C.O.P. at a temperature lift much higher than usual, without danger of crystallization, even at high generator temperature (up to 330° C.) and evaporator temperature as low as minus 10° C., while in most cases the absorber and condenser can be economically cooled by (ambient) air.

4 Claims, 5 Drawing Sheets

SINGLE EFFECT ABSORPTION CHILLER

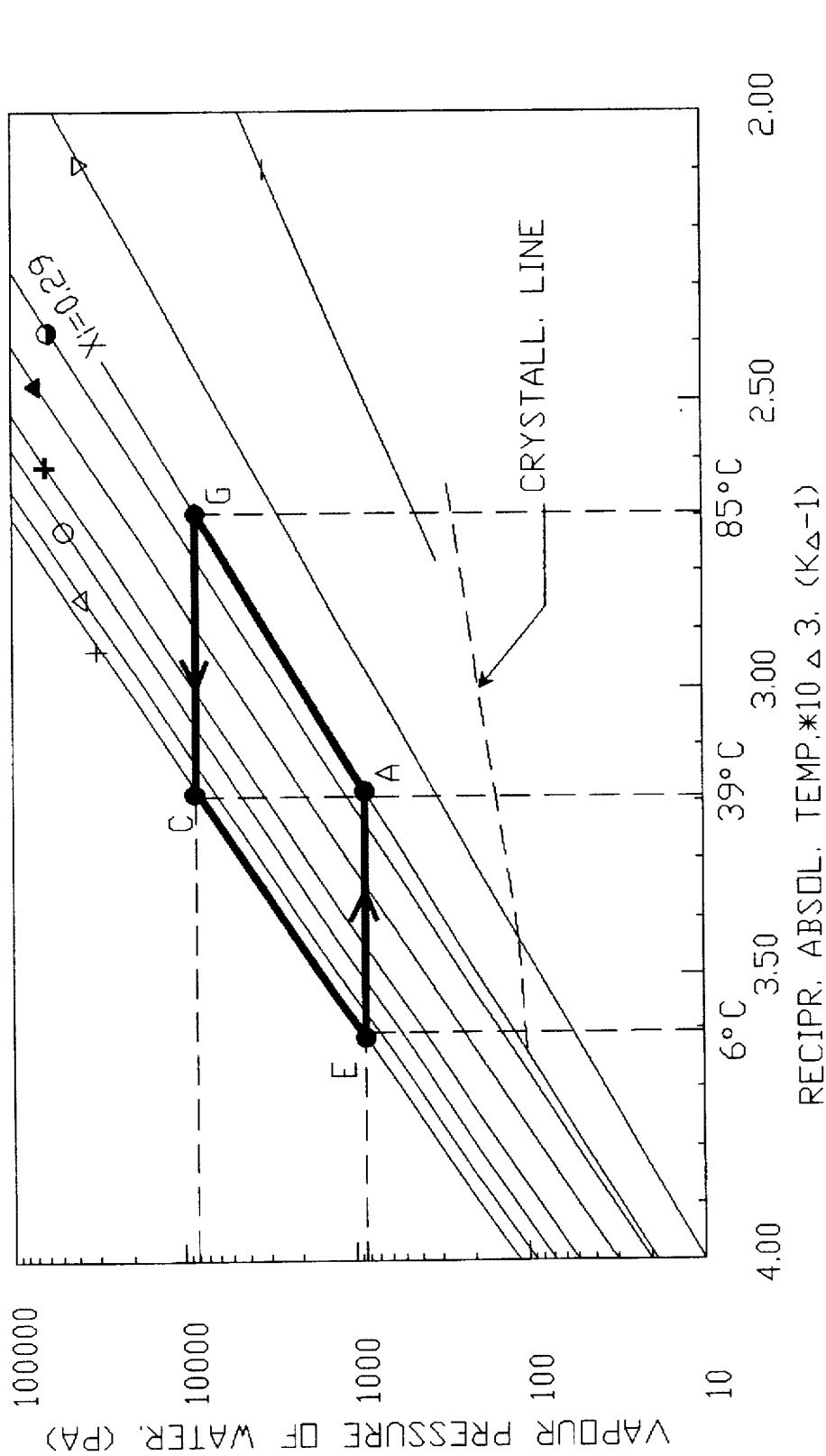

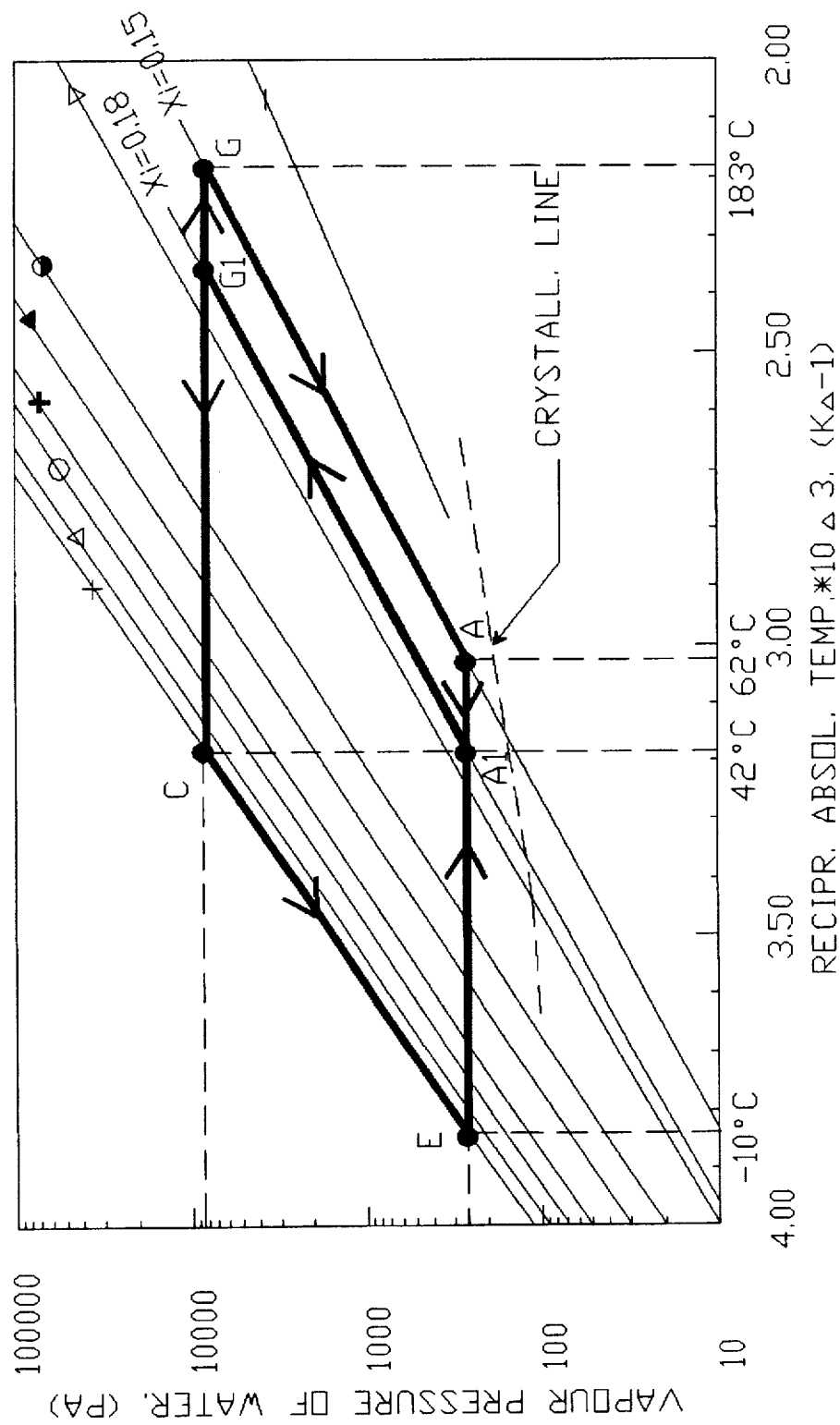

5,723,058

ABSORBENT COMPOSITIONS FOR REFRIGERATING AND HEATING SYSTEMS

BACKGROUND OF THE INVENTION

Until now the following absorbents for the refrigerant water have been proposed (besides lithium bromide and lithium chloride):

sulphuric acid (extremely corrosive)

sodium hydroxide (extremely corrosive)

phosphoric acid (corrosive; forms pyrophosphate)

lithium thiocyanate (thermally instable)

lithium iodide (will be oxidized to iodine)

mixture of lithium bromide and cesium bromide (no improvement)

mixtures of lithium bromide, calcium bromide and zinc bromide (acidic, thus corrosive)

People skilled in the art have prejudices against chlorates, because solid chlorates are strong oxidants. Solid lithium chlorate is used in pyrotechnics. Acidic solutions of chlorates are strong oxidizing, and are not compatible with the solvent water, which is oxidized by chlorate. Neutral and alkaline solutions of chlorates are surprisingly stabile, non-oxidizing, and compatible with water. Mixtures of lithium salts and their conjugate acids have never been proposed; they are evidently non-obvious. Lithium tetrafluoroborate, lithium hexafluoroborate, and lithium hexachlorophosphate have been found unexpectedly very soluble, have never been proposed, and are evidently non-obvious to one skilled in the art.

FIELD OF THE INVENTION

The present invention relates to absorption heat pump, heat transformer, air-conditioning and refrigeration systems and processes in which compositions are useful in said systems and processes, and as liquid coolants. More specifically, the present invention relates to improved absorption heat pump, heat transformer, air-conditioning and refrigeration systems and processes employing water as a refrigerant and an aqueous buffer solution of a lithium salt as an absorbent. Prior art as well as the present invention will be described here by their application in absorption refrigeration.

DESCRIPTION OF THE PRIOR ART

FIG. 1 of the accompanying drawings is a schematic diagram of a typical absorption refrigeration apparatus. In the generator section 1, heat energy from sources as steam, hot water, solar heat or electrical heat 2 is used to boil a dilute solution of lithium bromide and water. This boiling results in a release of water vapor, and in concentration of the remaining lithium bromide solution. The water vapor, or refrigerant, released in the generator 1 is drawn into the condenser section 3. The generator 1 and the condenser 3 are the "high" pressure side (0.1 bar absolute) of the machine. Cooling tower water 4 flowing through the condenser tube bundle 5 cools and condenses the refrigerant. The liquid refrigerant flows through an orifice 6 into the evaporator section 7. By means of pump 14 the refrigerant is pumped through sprinklers 16 spraying it over a tube bundle 8 containing building system water 17. The system water 17 gives up heat to the refrigerant, causing it to vaporize. The evaporator 7 and absorber 9 are the low pressure side (0.01 bar absolute) of the machine. The pressure in the evaporator 7 corresponds to a refrigerant saturation temperature of appr. 4.5° C. It is important to realize that the low pressure in the evaporator section 7 is the result of absorption of refrigerant vapor in the absorber section 9. The refrigerant vapor is drawn into the absorber section 9 by the low pressure resulting from absorption of the refrigerant into the absorbent. In order to expose a large amount of lithium bromide solution surface to the water vapor, the solution is sprayed, by means of sprinklers 10, over the absorber tube bundle 11. Cooling tower water 4 is used in this tube bundle 11 to remove the heat of absorption that is released when the refrigerant vapor returns to the liquid state. The degree of affinity of the absorbent for refrigerant vapor is a function of the absorbent solution concentration and of temperature. The more concentrated and the cooler the solution, the greater the affinity for refrigerant vapor.

Consequently the pressure, and thereby the saturation temperature in the evaporator is controlled by the concentration of the lithium bromide solution in the absorber 9. The concentration of this solution is determined by the amount of heat applied to the generator section 1 of the machine. In this design the concentrated solution coming from the generator 1 is mixed with dilute solution from the absorber 9, in order to increase the amount of flow, by means of pump 15, through the absorber sprinklers 10.

As the absorbent absorbs refrigerant vapor, the solution becomes increasingly dilute. It is necessary to continuously circulate, by means of pump 13, this dilute solution back to the generator in order to keep the cycle continuous. The heat exchanger 12 exchanges heat between the relatively cool, dilute solution being transferred from the absorber 9 to the generator section 1, and the hot concentrated solution being returned from the generator 1 to the absorber 9. Transferring heat from the concentrated solution to the dilute solution reduces the amount of heat that must be added to bring the dilute solution to boil.

Simultaneously, reducing the temperature of the concentrated solution reduces the amount of heat that must be removed from the absorber section 9, in order to obtain desired absorber efficiency.

Efficient operation of the heat exchanger 12 is extremely important to the economical operation of the lithium bromide-water cycle.

Numerous refrigerant-absorbent combinations have been proposed in the art. Those of principal interest employ water as the volatile refrigerant, in preference to toxic and/or inflammable substances such as ammonia or volatile organic fluids, having unfavorably low heats of evaporation.

Refrigerant-absorbent combinations for absorption heat pumps have to meet many requirements, the most important of which are:

1. the heat of evaporation of the refrigerant should be as high as possible.
2. the solubility of the absorbent in the refrigerant solvent should be as high as possible.
3. the lowering of the refrigerant vapor pressure over the absorbent solution should be as high as possible.
4. refrigerant and absorbent have to be compatible; meaning the combination has to be chemically and thermically stabile.
5. the viscosity of the solution should be as low as possible.
6. the combination has to be non-toxic (or low-toxic).
7. the combination has to be non-corrosive.
8. the combination has to be non-expensive.
9. the combination has to be environmentally safe.

10. the combination has to be non-flammable.

11. the difference in boiling points of refrigerant and absorbent should be at least 200° C., so that rectification is unnecessary.

12. the degasification width should be as large as possible.

13. the combination should be low in specific heat.

14. the density of the combination should be as low as possible.

15. preferably, the absorbent should be commercially available and/or easily to synthesize.

Most of which resulting in a high coefficient of performance (C.O.P.) and the construction of economically feasible absorption heat pump and refrigeration systems and processes. The most common aqueous refrigerant composition utilizes aqueous lithium bromide as the absorbent which has the following severe disadvantages:

1. the solubility of lithium bromide in water is insufficiently high, resulting in a C.O.P. of only 1.73 for heating (or 0.73 for refrigeration).

2. even in saturated solutions of lithium bromide, the solubility of oxygen is too high, resulting in severe corrosion.

3. crystallization of lithium bromide causes plugging of the apparatus by solute at ambient temperature.

SUMMARY OF THE INVENTION

According to the present invention, absorption refrigeration, heat pump, heat transformer and air-conditioning systems and processes are described employing novel absorption compositions, also useful as coolants, comprising an aqueous buffer solution of a lithium salt in combination with a trace of the corresponding acid (having a common anion).

Specifically, the compositions of the present invention suitable combine lithium chlorate ($LiClO_3$) and chloric acid ($HClO_3$) at a molar ratio about 100,000,000:1; or consist of an aqueous solution of lithium tetrafluoroborate ($LiBF_4$) and a trace of tetrafluoroboric acid ($HBF_4$); or consist of an aqueous solution of lithium hexachlorophosphate ($LiPCl_6$) and a trace of hexachlorophosphoric acid ($HPCl_6$); or consist of an aqueous solution of lithium hexafluorophosphate ($LiPF_6$) and a trace of hexafluorophosphoric acid ($HPF_6$), all of which resulting in perfectly neutral solutions of pH is 7.00. These solutions present no unusual health hazards and are very inexpensive. Numerous other salts and salt combinations as absorbents for water have been proposed in the art, cf. U.S. Pat. Nos. 3,004,919; 3,296,814; 3,478,530; 4,801,393; 4,857,222 and 5,108,638 none of which has resulted into practical application because of a diversity of severe disadvantages. For example, lithium iodide is chemically instable in aqueous solution, and is oxidized to iodine; lithium thiocyanate in aqueous solution is thermically unstable and decomposes on heating; zinc chloride and zinc bromide in aqueous solution react strongly acidic, resulting in severe corrosion of current construction materials, and so on, and so on.

Generally lithium salts having (large) anions with a spherically symmetrical structure appear to be very soluble in water, so it was very surprising that said buffer composition, having an asymmetrical anion, was found to be extremely soluble in water, resulting in an extremely large lowering of the water vapor pressure over the solution, and comprising said absorbent mixture to be highly concentrated in the generator of an absorption refrigeration apparatus by heating to temperatures higher than those possible in such apparatus, employing conventional absorption refrigeration compositions. Even more surprising was the stability of the refrigerant-absorbent combination, even at temperatures up to 330° C., which is the normal boiling point of a solution having a refrigerant concentration $Xi=0.1$ (Xi is kg of water divided by kg of buffer solution).

This has consequences of great advantage.

First, high pressure steam, e.g. steam at 125 psig (equal to 860 kPA or appr. 8.5 bar) pressure-conventional for steam generation and distribution-, or at still higher pressures may be used directly to heat the generators of refrigerant-absorbent combinations of the present invention. In the prior art, generators heated by steam, pressure is limited to appr. 20 psig and 176° C. to prevent over-concentration of the refrigerant-absorbent combination by excessive heating and removal of too much refrigerant therefrom.

Over-concentration results in the precipitation of solids, which may cause undesirable plugging of the apparatus. More important, because of the extremely low vapor pressure of water over concentrated buffer absorbent solutions of the invention, the absorbent may be present in the absorber at temperatures higher than those permissible when using conventional absorption refrigeration compositions, while still producing the same cooling temperature in the evaporator. This in turn permits cooling of the absorber by rejection of heat to a heat sink at a temperature higher than that found feasible in the prior art. For example, systems employing aqueous solutions of lithium bromide as an absorption refrigeration composition are limited to operation employing cooling water (i.e. at a temperature of less than about 32° C.) as the cooling medium in the absorber. This requires that the systems be operated with a natural supply of cooling water, such as from a river or well, or that the water coolant be recycled after rejection of heat therefrom to an air heat sink by evaporation in a cooling tower.

According to the present invention, the coolant, such as water, to which heat is rejected in the absorber of a refrigeration apparatus may be at temperatures considerably above 32° C. and is also rised in the absorber to such high temperatures that direct cooling of this water by air is feasible without need for evaporative cooling and its concomitant water loss. Accordingly, it is a principal object of the present invention to provide absorption heat pump/refrigerating systems and processes, adaptable to air-cooled operation.

It is another object of the invention to provide absorption heat pump and refrigeration systems and processes capable of producing evaporator temperatures of 0° C. or less.

It is another object of the invention to provide absorption heat pump and refrigeration systems and processes employing elevated generator temperatures which can be attained by heating with steam at pressures up to 150 psig (10.3 bar) and even higher (temperature limit 330° C. max.).

It is a further object of the present invention to provide stabile, non-toxic and non- corrosive absorption heat pump and refrigeration compositions adaptable to a high degree of concentration to give absorbent solutions of exceptionally low vapor pressure, while retaining properties, such as viscosity and rate of water absorption comparable with aqueous absorption refrigeration (and heat pump) compositions now employed in the art.

It is also an object of the present invention to provide aqueous coolant compositions of high boiling point and low vapor pressure.

It is another object of the invention to provide absorption heat pump (and refrigeration) and coolant compositions comprising a perfectly neutral aqueous buffer solution of lithium chlorate and chloric acid, in the proportions hereinafter described and claimed (among others).

It is still another object of the present invention to provide absorption heat pump and refrigeration systems and processes (which are already existing), with the absorption heat pump/refrigeration compositions of the present invention.

DESCRIPTION OF THE DRAWINGS

Other objects and advantages of the present invention will be better understood by reference to the further accompanying drawings in which:

FIG. 4 is a Dühring equilibrium diagram of aqueous solutions of lithium chlorate and chloric acid with the water refrigerant concentration Xi as a parameter, together with the plotted positions of generator, condenser, evaporator and absorber, showing a situation at low generator temperature, which is the case by using the heat of district heating for air-conditioning purpose.

FIG. 5 is a Dühring equilibrium diagram as described above, but now showing a situation at a temperature of minus 10° C. in the evaporator.

DETAILED DESCRIPTION OF THE INVENTION

Figure 1:
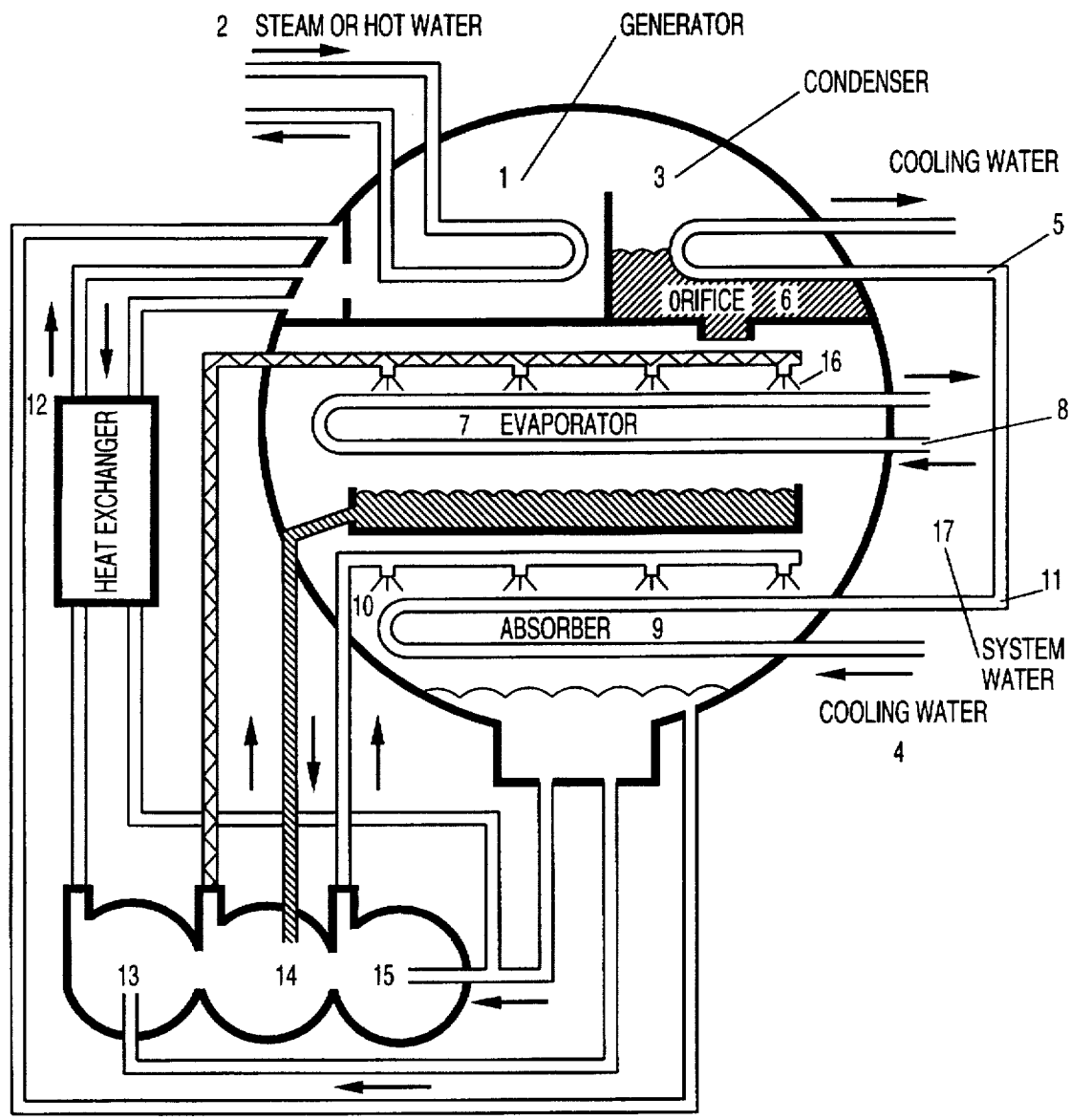
FIG. 1 of the accompanying drawings is a schematic diagram of a typical absorption refrigeration apparatus.

Using the chlorate buffer systems of the present invention, aqueous absorber solutions, which are neutral in pH, can be prepared at very much higher electrolyte concentrations suppressing the solubility of oxygen in the solutions to a much larger extent, resulting in the elimination of corrosivity, and having very much lower water vapor pressures than is possible with a lithium halide, such as lithium bromide.

Heretofore in the absorption heat pump/refrigeration art, the goal has been to employ absorbents those solutes (having properties otherwise compatible for use in absorption heat pump/refrigeration systems) which have spherically symmetrical anions, such as halide anions, and which show the highest solubility in the refrigerant water and the largest negative deviation from Raoult's Law, resulting in the lowest effective concentration of the refrigerant water, and resulting in the lowest water vapor pressure over the aqueous absorbent solution. Superficially, then, it would appear to one skilled in the art that the compositions of the present invention with asymmetrical chlorate anions would be less suitable for use in absorption heat pump/refrigeration systems than compositions already known in the art. It could not be foreseen by one skilled in the art that the chlorate buffer systems having asymmetrical anions of the present invention can, however, form solutions of such extremely high concentrations before reaching saturation at very much lower vapor pressure than those attainable over lithium halide solutions of lower saturation concentration.

Superficially, then, it would also appear to one skilled in the art that very strong oxidants as lithium chlorate and chloric acid would oxidize the solvent water, and that (a mixture of) these compounds would be totally unsuitable for use in absorption heat pump/refrigeration systems, in contrast with compositions already known in the art. It could not be foreseen by one skilled in the art that the chlorate buffer systems of the present invention can, however, form solutions of such high concentrations before reaching saturation, and of such high chemical and thermal stability, even at temperatures up to 330° C. at lower vapor pressures than those attainable over solutions of lower saturation concentration now used in the art.

These advantageous properties of aqueous solutions of chlorate buffers similarly could not be foreseen from contemplation of the properties exhibited by alcohol solutions of the electrolytes, known in the art for 51 years [cf. Hainsworth, "Refrigeration and Absorbents" Part I. Refrig. Eng. 48,97–100 (1944); Part II ibid. 48,201–205 (1944) and the more recent review of this work by Aker, Squires and Albright in the ASHRAE Journal, 90–91 (May 1965) and the ASHRAE Transactions 71, Part I, 14–20 (1965)].

The alcohol solutions, of course, are open to the fundamental objections of flammability and toxicity. They further have vapor pressure temperature relationships so significantly different from those of aqueous systems that they cannot be used in the apparatus now commonly and conventionally employed for such systems.

Figure 2:
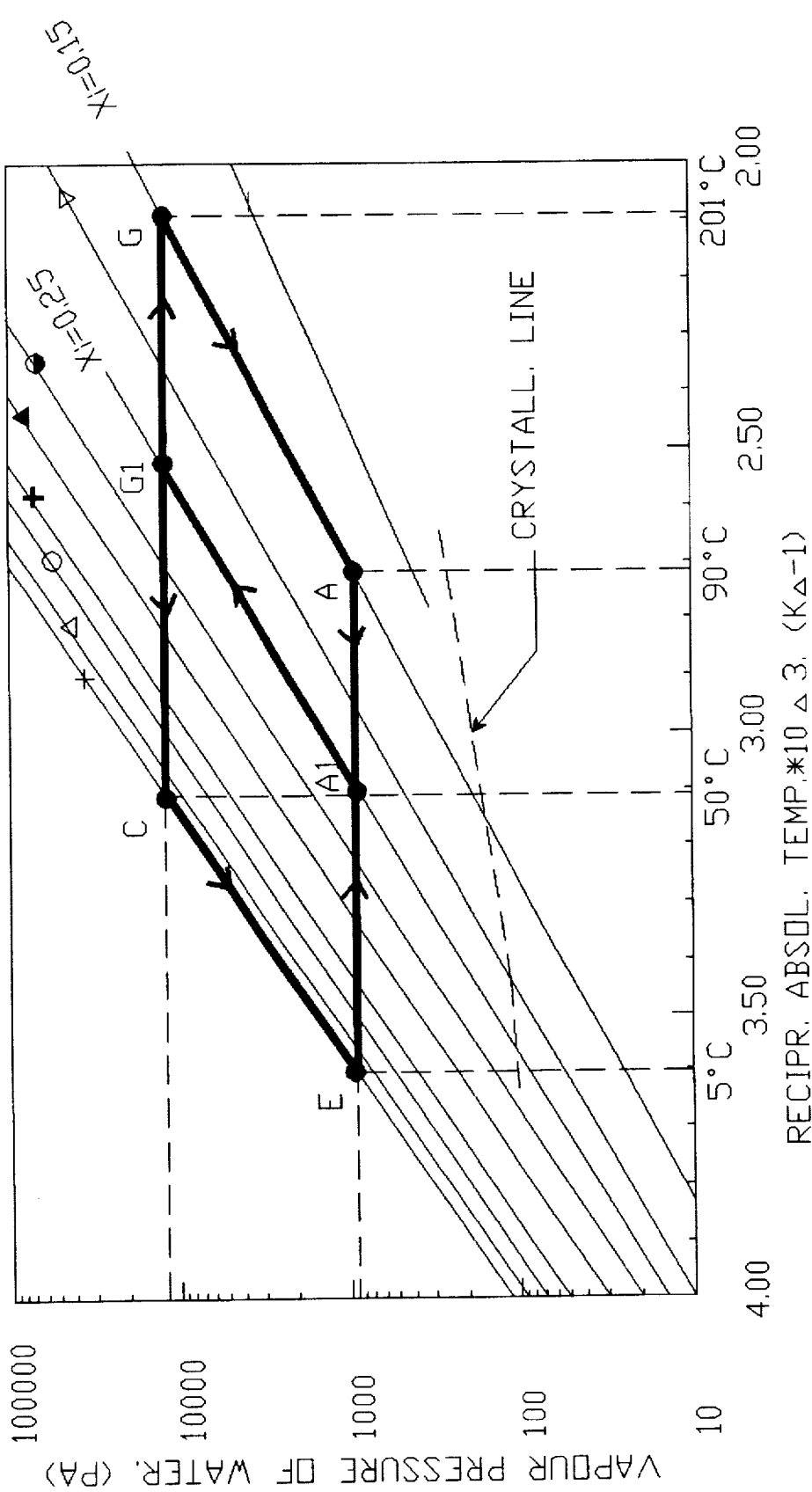
FIG. 2 is a Dühring equilibrium diagram of aqueous solutions of lithium chlorate and chloric acid with the water refrigerant concentration Xi as a parameter, together with the plotted positions of the generator (G), the condenser (C), the evaporator (E), the absorber (A) and heat exchanger (A1-G1), which were found in an experimental set-up, with high generator temperature.
Figure 3:
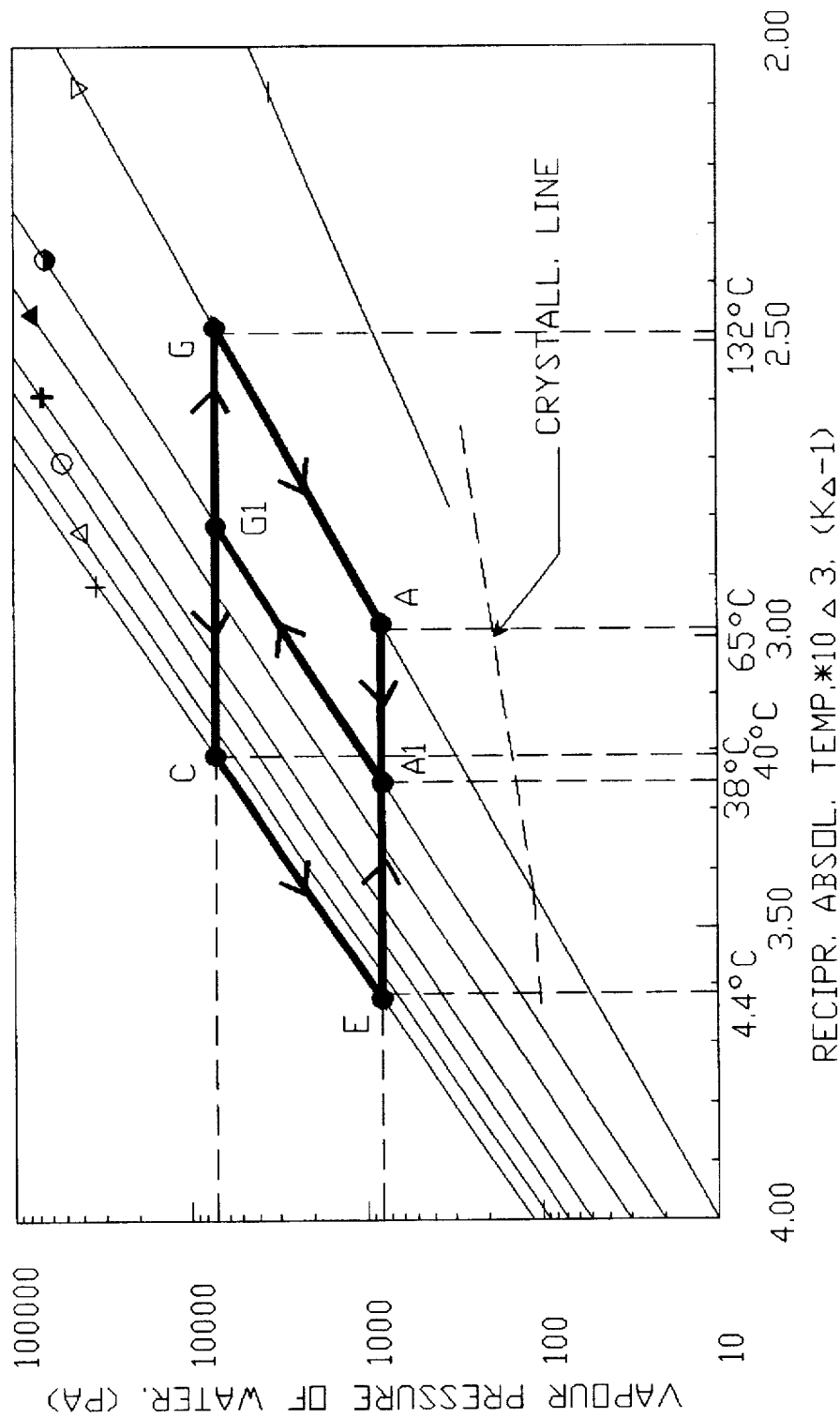
FIG. 3 is a Dühring equilibrium diagram of aqueous solutions of lithium chlorate and chloric acid with the water refrigerant concentration Xi as a parameter, together with the plotted positions of generator, condenser, evaporator, absorber and heat exchanger, showing a situation at medium generator temperature.

FIG. 2 is the Dühring equilibrium diagram of the preferred embodiment of the present invention. The crystallization line can be seen herein, as well as the superimposed lines of the two preferred working cycles, one for the refrigerant water and one for the absorbent of the present invention. As can be seen from FIG. 3 both working cycles are far away from the crystallization line. In such systems there never is the possibility that an accidental or inadvertent departure from optimum operating conditions will result in crystallization and plugging of the apparatus. While the much higher solubility limits of the chlorate buffer systems of the present invention permit operation at much higher temperatures and concentrations, without danger of crystallization, as is evident from FIG. 3, the systems of the invention have other advantageous properties (not evident from the figure). A circulating aqueous solution of the absorbent according to the present invention remains fluid at temperatures significantly below those which would result in the plugging of cooling apparatus employing a material such as aqueous lithium bromide.

This is not due only to the lower crystallization temperatures for the chlorate buffer solutions as compared with a solution of equivalent concentration of aqueous lithium bromide, but also for unexpected kinetic and mechanical reasons. Thus, the solutions of the present invention are apparently capable of a higher degree of super-cooling than is possible in solutions of materials such as lithium bromide. As a result the formation of crystals in the solutions of the present invention often requires a longer period of time than does crystal formation in lithium bromide solutions, even though both solutions may be below their respective crystallization temperature. Further, compositions according to the present invention containing precipitated crystals and supernatant liquid remain surprisingly fluid under conditions in which complete plugging would occur if lithium bromide were present. This continued fluidity is believed to be related to the form of the crystals which are precipitated. Thus, even though precipitation may occur in the absorbent solutions of the present invention, the crystals formed are of such a size and physical character as will permit some fluid circulation even below the crystallization temperature.

Typical parameters for a refrigeration cycle employing the novel lithium chlorate/chloric acid buffer solution as a refrigerating composition are evident from inspection of the closed curve on the diagram shown in FIG. 2. Point A1 of the curve represents the temperature, pressure and refrigerant concentration prevalent in an absorption refrigeration composition, rich in refrigerant, in an absorber at a temperature of about 50° C. Heating of the composition is effected in two stages: first, by heat exchange with solution, poor in refrigerant, coming from the generator (as represented by line A1-G1) and second, by heating from outside sources (line G1-G). The temperature of the composition is raised to about 201° C. at point G (generator). Due to temperature increase, the chlorate buffer solution becomes stronger by removal of refrigerant (water) in the generator and the value Xi decreases from Xi=0.25 to Xi=0.15. By heat exchange with solution, rich in refrigerant, entering the generator, the solution—poor in refrigerant—leaving the generator is next cooled from about 90° C. to 50° C., causing an increase of refrigerant concentration (a solution rich in refrigerant) as represented by line A-A1. The refrigerant vapor formed in the generator (G) flows into the condenser (C), where it is forced to condense by giving up heat to a cooling source (ambient air), represented by line Gi-C; it is clear that the refrigerant concentration becomes 100% (pure water), coming from Xi=0.25 to Xi=1. Due to the differential pressure created by the hygroscopic effect of the high concentrated buffer solution in the absorber (A) the condensed refrigerant passes an orifice and enters the evaporator where the refrigerant (water) immediately starts to evaporize (under pressure of appr. 90 Pa) and withdrawing heat from the (air-conditioning) system water, through a heat exchanging coil, reaching a temperature of about 5° C. at point E, represented by line C-E. Finally the refrigerant is drawn to the absorber section A1, as vapor and generates absorption heat, which heat is evacuated by a cooling source (ambient air) represented by line E-A1. Herewith the cycle is closed.

Because the water vapor pressure of e.g. a saturated aqueous solution of the chlorate buffer of the present invention (e.g. at 60° C.) is about ten times lower than that of a saturated aqueous solution of lithium bromide of the prior art at the same temperature, the temperature differences between evaporator and absorber, and between absorber and generator can be much larger.

Because the solutions of the present invention can be made very poor in refrigerant concentration without crystallization, i.e. can be brought to high temperatures, they can be used in apparatus employing generator temperatures which are not possible using other compositions. Because high pressure steam can be used as a heat source, eliminating the need for apparatus reducing the steam pressure from pressures at which it is usually distributed, significant apparatus simplification and cost reduction is possible. As mentioned earlier, the use of high-temperature steam as a heating source in the generator also makes air-cooling of the absorber and condenser feasible. All these advantages of the present invention result in a much more economical operation (higher C.O.P.).

Typical parameters for (ambient) air-cooled absorption refrigeration systems employing the absorption refrigeration composition(s) of the present invention and high generator temperatures are shown in FIG. 2 on which the closed curves—describing simplified refrigeration cycles—are plotted. FIG. 5 is a simplified equilibrium diagram like that of FIG. 2 on which is plotted a curve descriptive of the typical operation of a refrigeration system employing a combination of the present invention to produce an evaporator temperature of about minus 10° C. A temperature of about 42° C. is maintained in both absorber and condenser by air- or water cooling. A temperature of about 183° C. is used in the generator. The orifice has been kept free of building ice by means of a controlled amount of heat, coming from the solution out of the absorber. A system of this sort permits rapid production of low temperatures and is useful for quick-freezing of substances, such as foods.

In absorption refrigeration systems of commercial interest, the novel aqueous buffer solutions of the present invention are preferable used at electrolyte concentrations producing an elevation in the normal boiling point of at least 16° C. The concentration by mass of electrolyte required to give this minimum elevation will vary with the specific electrolyte mixtures employed. Maximum electrolyte concentrations are determined only by the crystallization limits of the solutions at the operating temperatures prevailing in the generator and absorber of the specific refrigeration systems in which they are employed. In general, the electrolyte concentrations vary between 55 percent by mass and 67 percent by mass, but in the present invention solutions of lithium chlorate and chloric acid electrolyte concentrations between 75 percent of mass and 95 percent of mass would be preferred for use in commercial refrigeration systems.

At lower electrolyte concentrations, the solutions are of utility as coolants, e.g. for the engines of motor vehicles or other machinery employing water cooling. Because of their low vapor pressure, the coolants can be employed in sealed systems (suitable having an expansion tank or other expandable member) excluding atmospheric air. This has the advantage of totally eliminating corrosion. Because of their high boiling points, the coolants can be circulated at substantially atmospheric pressures at temperatures higher than those possible with other coolant fluids. The greater efficiency of heat transfer processes with larger temperature differences in turn permits heat exchange systems of smaller size. The novel solutions of the present invention, used as an absorbent for heat pump/refrigeration systems can also be used in industrial dehumidifying or drying processes, because of their very high hygroscopic behavior.

EXAMPLE I

In an experimental set-up of the present invention, using an existing single effect absorption refrigeration system with minor adaptations, filled with the novel chlorate buffer solution (lithium chlorate/chloric acid mixture with a molar ratio of 100,000,000:1) have been used. The generator was heated by electrical elements and the temperature of the generator was controlled at 201° C. (see FIG. 2). The temperature of both absorber and condenser was kept on appr. 50° C. by indirect ambient air cooling by keeping a constant evaporator temperature of 5° C. The electrical power needed for heating the generator was determined to be 1.380 kW. At the same time the cooling capacity on the system water side has been calculated as 1.283 kW, resulting in a C.O.P. equal to 0.93, which is about 27% better than absorption refrigeration systems of the prior art.

EXAMPLE II

An aqueous solution of 50% (by weight) lithium tetrafluoroborate was prepared, pH of which was determined to be around 7. This absorbent solution was transported into the refrigeration system mentioned in example I. The generator was electrically heated to 190° C. The temperature of both absorber and condenser was controlled at appr. 50° C. by indirect ambient air-cooling by keeping a constant evaporator temperature of 5° C. The consumed electrical power was measured to be 1.427 kW and the simultaneously determined cooling capacity was found to be 1.098 kW, resulting in a C.O.P. equal to 0.77.

EXAMPLE III

An aqueous solution of 50% (by weight) lithium hexafluorophosphate was prepared, pH of which was determined to be around 7. This absorbent solution was transported into the refrigeration system mentioned in example I. The generator was electrically heated to 195° C. The temperature of both absorber and condenser was controlled at appr. 48° C. by indirect ambient air-cooling by keeping a constant evaporator temperature of 4.5° C. The consumed electrical power was measured to be 1.312 kW and the simultaneously determined cooling capacity was found to be 1.168 kW, resulting in a C.O.P. equal to 0.89.

EXAMPLE IV

An aqueous solution of 50% (by weight) lithium hexachlorophosphate was prepared, pH of which was determined to be around 7. This absorbent solution was transported into the refrigeration system mentioned in example I. The generator was electrically heated to 210° C. The temperature of both absorber and condenser was controlled at appr. 52° C. by indirect ambient air-cooling by keeping a constant evaporator temperature of 6° C. The consumed electrical power was measured to be 1.240 kW and the simultaneously determined cooling capacity was found to be 1.079 kW, resulting in a C.O.P. equal to 0.87.

I claim:

1. A composition for use in the Absorber and Generator of an absorption type refrigeration, air conditioning, heat transforming or heat pump system consisting essentially of an aqueous buffer solution of lithium chlorate and chloric acid, wherein the molar ratio of lithium chlorate to chloric acid is about 100,000,000:1.

2. The composition of claim 1 in which said solution has a neutral pH.

3. A coolant consisting essentially of an aqueous buffer solution of lithium chlorate and chloric acid, wherein the molar ratio of lithium chlorate to chloric acid is about 100,000,000:1.

4. A drying agent for use in industrial dehumidifying and drying processes consisting essentially of an aqueous buffer solution of lithium chlorate and chloric acid, wherein the molar ratio of lithium chlorate to chloric acid is about 100,000,000:1.

\* \* \* \* \*